A. ANDERSON.
POWER TRANSMISSION MECHANISM.
APPLICATION FILED JULY 2, 1913.
1,153,882.
Patented Sept. 21, 1915.
5 SHEETS—SHEET 1.
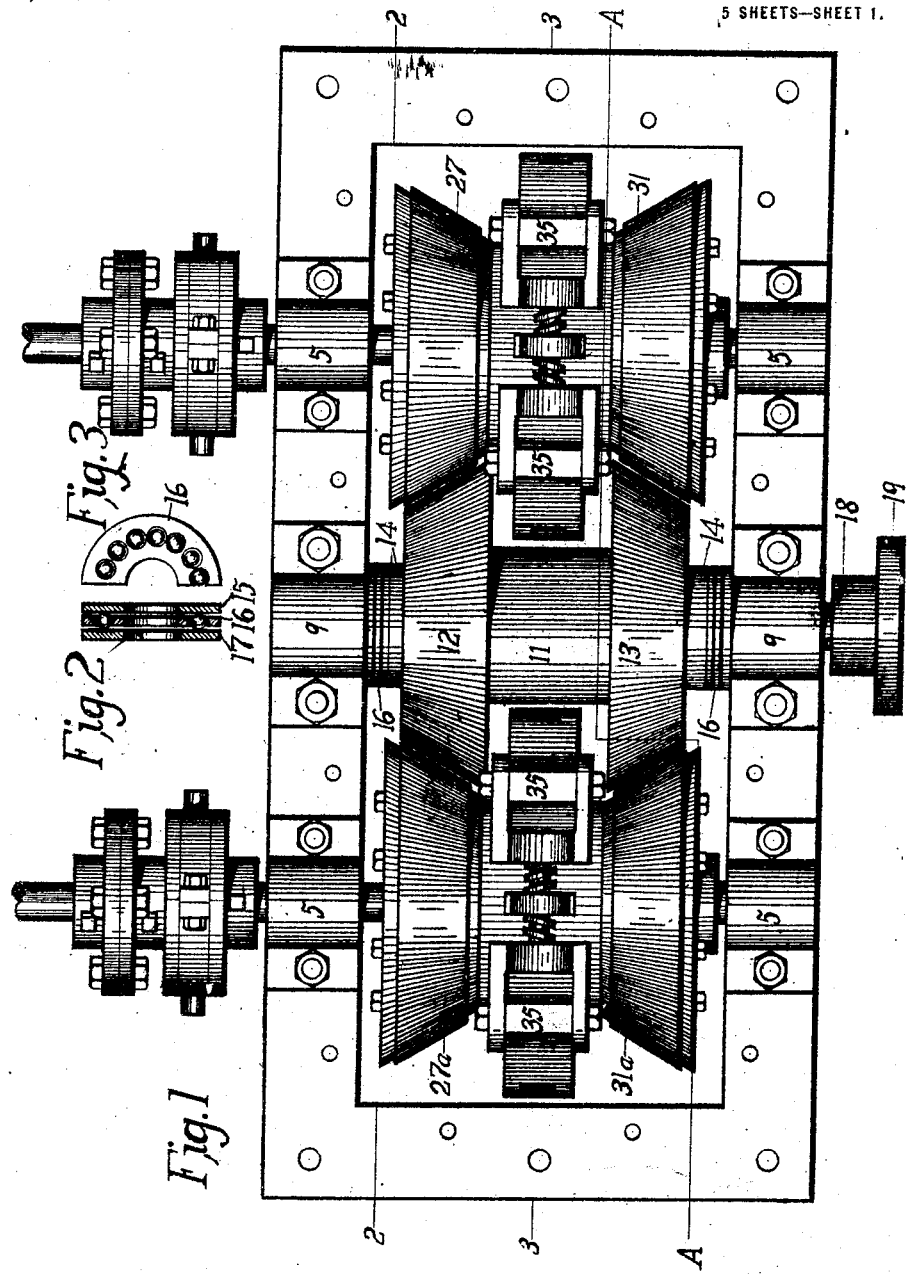
WITNESSES:
INVENTOR
Andrew Anderson.
BY
ATTORNEY A. ANDERSON.
POWER TRANSMISSION MECHANISM.
APPLICATION FILED JULY 2, 1913.
1,153,882.
Patented Sept. 21, 1915.
5 SHEETS—SHEET 2.
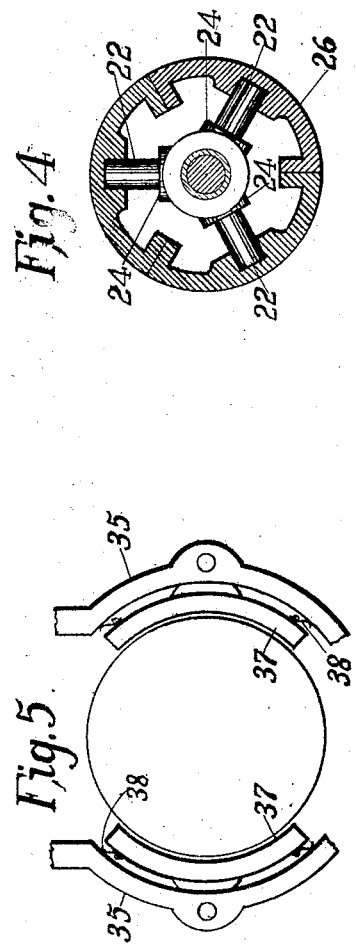
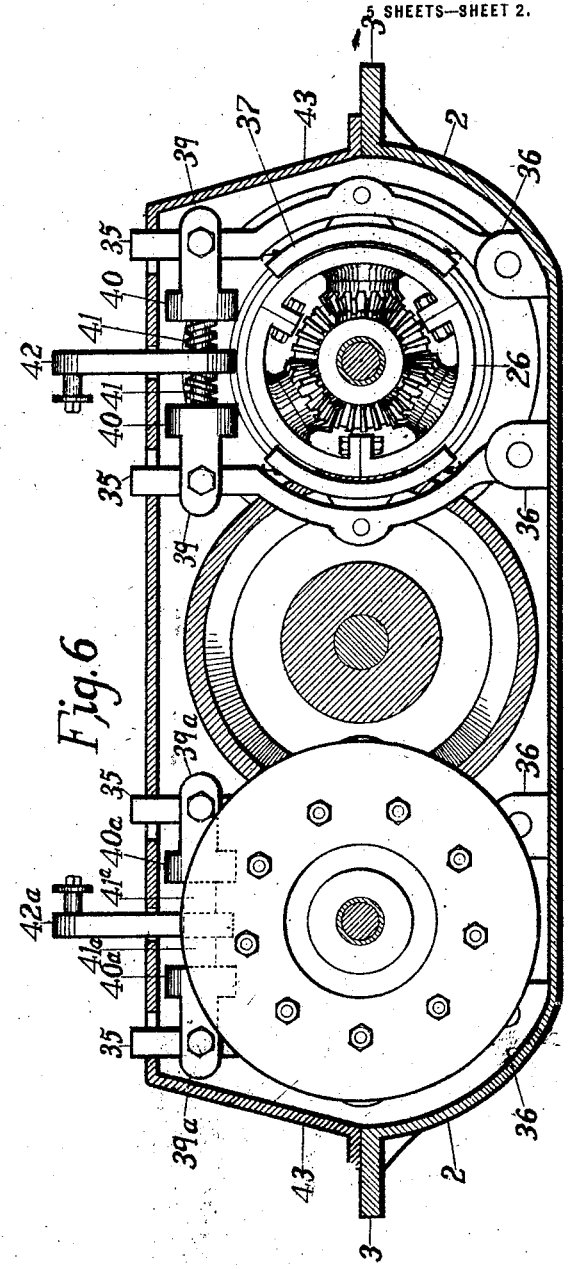
WITNESSES:
N. D. Haberlin
David E. Lofgren
INVENTOR
Andrew Anderson
BY
Peter Haberlin
ATTORNEY

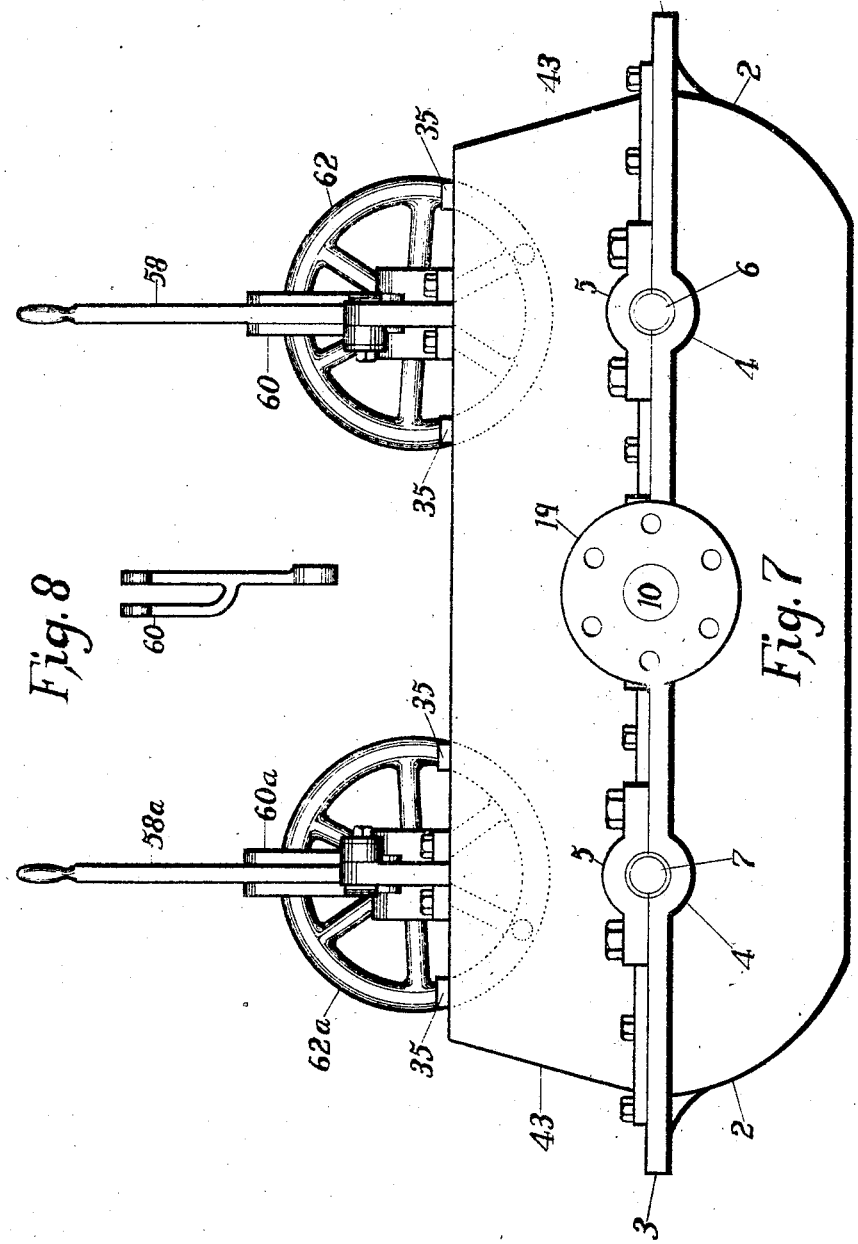

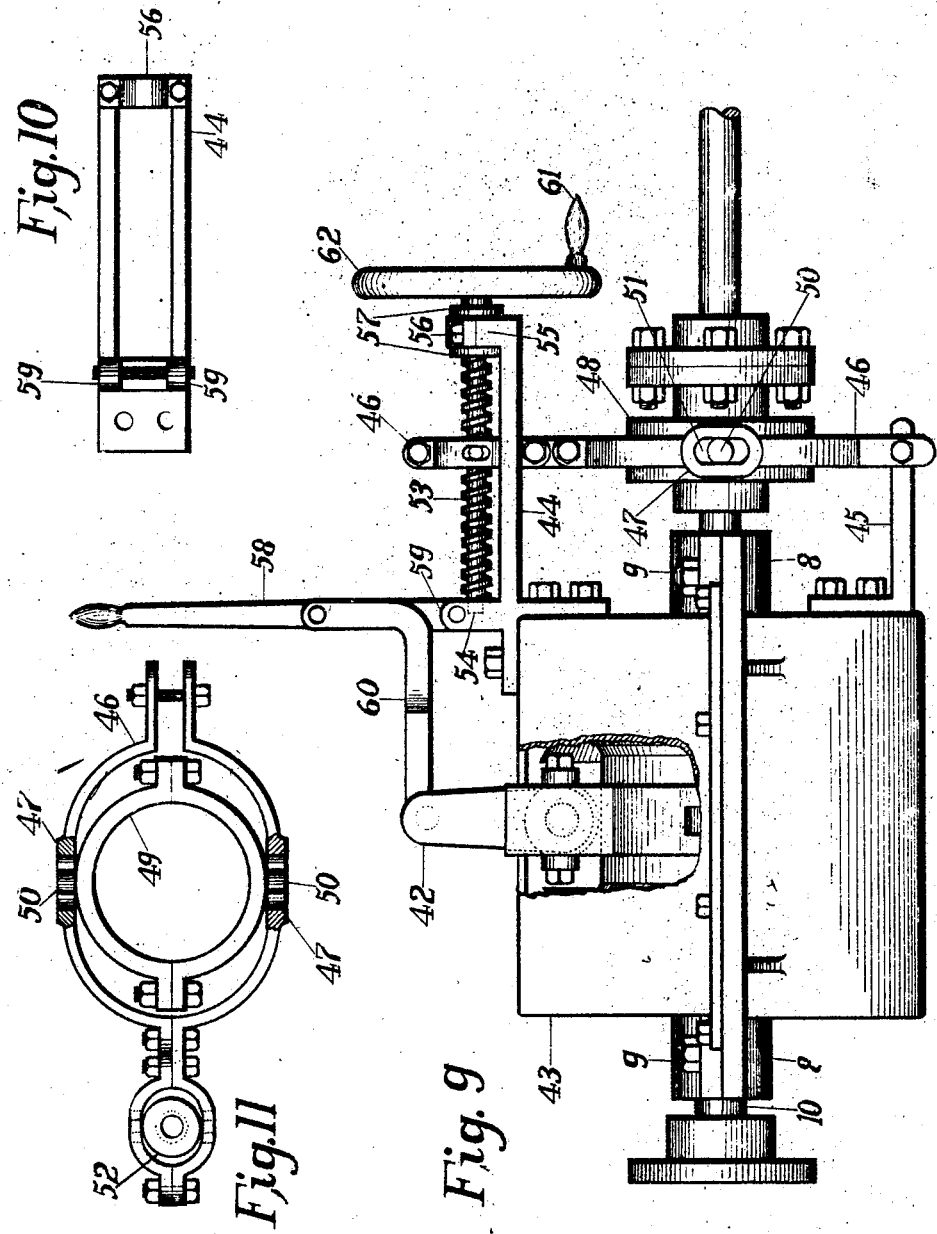

A. ANDERSON.
POWER TRANSMISSION MECHANISM.
APPLICATION FILED JULY 2, 1913.
1,153,882.
Patented Sept. 21, 1915.
5 SHEETS—SHEET 5.
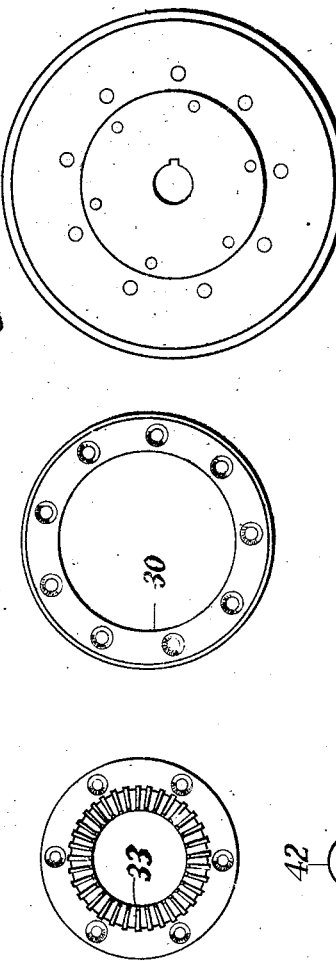
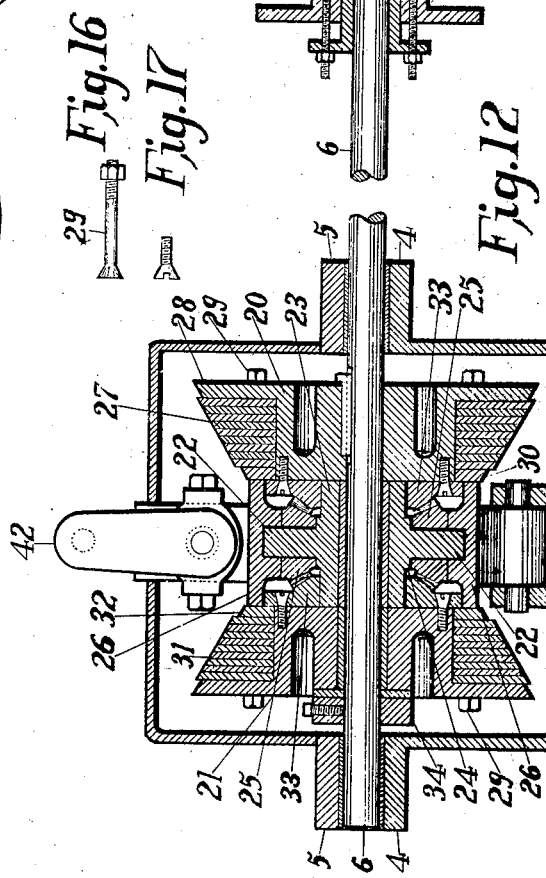
WITNESSES:
N. D. Haberlin
David E. Lofgren
INVENTOR
Andrew Anderson
BY
Peter Haberlin
ATTORNEY

UNITED STATES PATENT OFFICE.

ANDREW ANDERSON, OF PORTLAND, OREGON.

POWER-TRANSMISSION MECHANISM.

1,153,882. Specification of Letters Patent. Patented Sept. 21, 1915.

Application filed July 2, 1913. Serial No. 776,976.

*To all whom it may concern:*

Be it known that I, ANDREW ANDERSON, a citizen of the United States, residing at Portland, in the county of Multnomah, and State of Oregon, have invented certain new and useful Improvements in Power-Transmission Mechanism, of which the following is a specification.

My invention relates to power transmission mechanism, and more particularly to power transmission mechanism adapted for connecting an engine or power-furnishing mechanism with a plurality of elements or members to be driven, such, for example, as propellers, traction or other wheels.

Among the salient objects of my invention are, to provide a power transmission mechanism of the character referred to adapted for connecting a single engine or power-furnishing mechanism with a plurality of elements or members to be driven, and to drive those elements or members together in either direction or in different directions from one engine; to provide in such a mechanism a construction wherein the engine can be allowed to run without driving either of said elements; to provide in a mechanism of the character referred to means for quickly reversing the direction of either one or both of the driven elements or members without reversing the engine; and, in general, to provide a mechanism of the character referred to which is practical, simple and efficient.

In order that others may thoroughly understand my invention, I have shown in the accompanying sheets of drawings one practical embodiment thereof, and for this purpose have chosen to show it adapted for driving two propellers from one engine, although it is quite evident that the invention can be used in other places and for other purposes.

In the drawings, Figure 1 is a top plan view of my invention with the cover of the casing removed: Fig. 2 is a section through the ball-bearing thrust portion and the rings each side of same: Fig. 3 is a plan view of one half of said ball bearing thrust portion: Fig. 4 is a cross section through the reverse-bands and also showing the small gear holder in elevation: Fig. 5 shows the brake-members (partly broken away) and the brake-shoes pivoted thereto: Fig. 6 is a longitudinal section through line A A of Fig. 1: Fig. 7 is a side elevation of Fig. 1, with the cap of the casing attached to the base, and the reversing and braking mechanisms: Fig. 8 is a plan view of the reach-rod: Fig. 9 is an end elevation of the mechanism shown in Fig. 7, partly broken away to show the braking mechanisms: Fig. 10 is a plan view of the shifting-screw bracket: Fig. 11 is a plan view of the shifting-lever and collar: Fig. 12 is a vertical longitudinal section through Fig. 9 (partly broken away) with the reverse-lever and shifting-screw bracket removed, and showing the brake-arm in elevation, and with the stuffing-box, tail-bearing and propeller added: Fig. 13 is a plan view of one of the bevel reverse-gears: Fig. 14 is a plan view of one of the detachable flanges which presses the material of which the friction-cone is composed against the permanent flange of said friction-cone: Fig. 15 is an end elevation of the friction-core and flange: Fig. 16 is a detail of one of the bolts 29, and Fig. 17 is a detail of one of the screws that fasten the bevel gears to the hub of the friction-core.

Like characters of reference indicate like parts in the several figures of the drawings, in which the numeral 2, indicates the base of the casing with flange 3, and boxes 4, integral therewith; the caps 5 are placed over boxes 4, and form bearings for shafts 6 and 7, respectively; boxes 8, also form part of base 2, and together with caps 9, form the bearings for driving-shaft 10, on which is mounted drum 11, of which driving-cones 12 and 13, and hubs 14, form integral parts. Revolubly mounted on shaft 10 are soft metal rings 15, ball-bearing thrusts 16, and soft metal rings 17, respectively; said ball-bearing thrusts being placed intermediate said soft metal rings; shaft 10 has also fastened thereto coupling 18, which is connected to the engine by means of flange 19, which forms part of said coupling.

The mechanisms that are attached to shafts 6 and 7, being identical, I will only describe the construction and arrangements of the parts attached to one of said shafts, (shaft 6) which can be best described by referring to Fig. 12; the parts being arranged as follows: Mounted on shaft 6, and keyed thereto is a friction-core 20, and another friction-core 21, which is loosely mounted on said shaft; attached to said shaft and also loosely mounted thereon is a gear-holder composed respectively of pintles 22, hubs 23 and bosses 24; revolubly placed on said pintles are small gears 25, which are held in place by reverse-band 26, which is made in three segments as shown in Fig. 4. Placed on friction-core 20, is a friction-cone 27, composed of a number of disks of some fibrous material, such as paper; one end of said friction-cone rests against flange 28 which is integral with said core 20, and is held in such position by means of bolts 29, which pass through said friction-cone and into detachable flange 30. Core 21 has also a friction-cone 31 attached thereto of the same material and in the same manner as said core 20 and is fastened thereto by means of bolts 29 and detachable flange 32. When said detachable flanges are fixed in place as above described, bevel gears 33, are placed on the hubs 23 of the gear-holder and secured to cores 20 and 21 in order to mesh with small gears 25, after which collar 34 is secured to shaft 6.

When all of the mechanisms are attached to the shafts as above described, the brake-members 35 are pivoted to lugs 36, (best illustrated in Fig. 6) after which brake-shoes 37 are pivoted to said brake-members and held in concentric relation thereto by means of leaf-springs 38; nut-straps 39—39$^a$, (of which nuts 40—40$^a$ form integral parts) are then fastened adjacent the upper portions of brake-members 35; said nuts being adapted to receive double-threaded screws 41—41$^a$ to which are attached brake-levers 42—42$^a$ respectively. When the braking mechanisms are thus assembled, the cap 43 is placed on base 2 and fastened thereto.

Now referring to Fig. 9, I will describe the combinations and arrangements of the shifting and reversing mechanisms: shifting-screw bracket 44, is firmly fastened to cap 43 and shifting-lever bracket 45 is fastened to base 2; pivoted to said shifting-lever bracket is a split shifting-lever 46 with portions 47 integral therewith; fitting into an annular groove in shifting collar 48, is a shifting-band 49, with pins 50 attached thereto, which pins register with slots 51 of the portions 47 of shifting-lever 46. Pivoted within the upper portion of shifting-lever 46 is a shifting-nut 52 which fits over shifting-screw 53, which is revolubly attached at one end (by means of pin 54) to shifting-screw bracket 44 and at its opposite end revolves in box 55 which is integral with said shifting-bracket and cap 56 which is secured to said box; said shifting-screw is held in fixed longitudinal relation to bracket 44 by means of collars 57 which are integral with screw 53 and placed at each side of box 55 and cap 56; reverse lever 58 is then pivoted to ears 59, and reach-rod 60 is pivoted to said reverse-lever 58 and reverse-arm 42. It will be noted that for the purpose of avoiding prolixity I have only described the reversing and shifting mechanisms that are attached to one side of my invention, but the mechanisms on the other side are identical with the exception that for reasons that will hereinafter appear, I have used the exponent $a$ in connection with the characters of reference.

In Fig. 1 of the drawings the driving cones and driven-cones are disengaged and when in this position shifting-lever 46 is perpendicular as shown in Fig. 9, and in order to operate my invention the engineer grips handles 61—61$^a$ of shifting-wheels 62—62$^a$ and turns them in such direction as to cause the upper end of shifting-levers 46—46$^a$ to move toward ears 59 of the shifting-screw brackets, which operations bring propeller cones 27 and 27$^a$, in contact with driving-cone 12; when said cones and shifting-levers are in the positions described the boat moves forward. When it is desired to reverse the motion of the boat, the operator simultaneously turns the wheel 62 and 62$^a$ in order to shift the cones 31 and 31$^a$ into contact with the driving cone 13, and then moves the levers 58 and 58$^a$ forwardly, or toward the engine. This operates to move the reverse arms 42 and 42$^a$, which are fixed to double screws 41—41$^a$ and said screws actuate nuts 40—40$^a$ toward each other, which nuts actuate brake-arms 35 and brake-shoes 37 and bring said brake-shoes in contact with reverse-band 26 which prevents cones 27—27$^a$ from turning shafts 6 and 7 respectively, and transmits the power for revolving said shafts from cones 31—31$^a$ through the medium of gears 33 and 25. When the boat is moving rearward and it is desired to reverse the motion, i. e. to cause the boat to move forward, the opposite operations would be necessary. When it is desired to turn the boat about quickly, the engineer turns the wheels 62 or 62$^a$ so as to bring cone 27 into contact with driving cone 12, and cone 31$^a$ into contact with driving cone 13, or so as to bring cone 31 into contact with driving cone 13 and the cone 27$^a$ in contact with driving cone 12, and then by moving one of the levers 58 or 58$^a$ forwardly, depending upon the direction which it is desired to turn the boat, one propeller acts against the other, and the boat will be turned quickly.

My invention may be constructed of any material and made of any size deemed suitable for such a mechanism, and while I have described and illustrated a preferred form of construction and combination of elements deemed suitable for such a device, I desire to include in this application all mechanical equivalents and substitutes that may be fairly considered to come within the scope of my invention as defined and specified in the appended claims.

Having thus fully described my invention so that others skilled in the art to which it appertains, may be enabled to construct and use the same, what I claim and desire to secure by Letters Patent, is:—

1. A power transmission mechanism comprising in combination a plurality of elements to be driven, a main driving member adapted to be driven from any power-furnishing mechanism, a pair of intermediate driving members connected with each of the elements to be driven, one of each pair having a positive connection with its element, and one of each pair being an idler, a differential driving mechanism between the driving members of each of said pairs, and means for establishing at will driving connections between said main driving member and the two idler members or the two positively connected members of said pairs of intermediate driving members.

2. A power transmission mechanism comprising in combination a plurality of elements to be driven, a main driving member adapted to be driven from any power furnishing mechanism, a pair of intermediate driving members connected with each of the elements to be driven, one of each pair having a positive connection with its element, and one of each pair being an idler, a differential driving mechanism between the driving members of each of said pairs, means for establishing at will driving connections between said main driving member and the two idler members or the two positively connected members of said pairs of intermediate driving members, and means for holding a part of either of said differential driving mechanisms, whereby it operates to transmit motion in an opposite direction from one of said driving members to the other.

3. A power transmission mechanism comprising in combination a plurality of elements to be driven, a main driving member adapted to be driven from any power furnishing mechanism, a pair of intermediate driving members for each of the elements to be driven each of said members being movably mounted and adapted to be moved into and out of driving engagement with said main driving member, one of said members of each pair being an idler, a differential driving mechanism between the intermediate driving members of each pair, means for moving said pairs of intermediate driving members to put one or the other of each pair in driving engagement with said main driving member, and means for putting said differential mechanism into operation to transmit motion in an opposite direction from one of said members to the other.

4. A power transmission mechanism, comprising in combination with two elements to be driven, a main driving member adapted to be driven from an engine, two bodily movable driving members connected respectively with the elements to be driven and movable into and out of driving engagement with said main driving member, means for so moving the same, two loose elements also adapted to be moved into and out of driving engagement with said main driving member, a differential mechanism connecting each of said loose elements with a movable driving member, and means for holding a part of each differential mechanism whereby it operates to drive the loose and movable members between which it is located in opposite directions, substantially as described.

5. In a power transmission mechanism, a main driving member adapted to be power driven, a main driving shaft, two driving members mounted on said shaft, one fixed thereto and the other loose thereon, a differential mechanism disposed between said two driving members and adapted to turn therewith, means for holding said differential mechanism at will, whereby it operates to transmit motion in a different direction from one of said driving members to the other, and means for putting either of said two driving members into driving engagement with said main driving member.

6. In a power transmission mechanism, a main driving member adapted to be power driven, two main driving shafts at opposite sides thereof, two driving members mounted on each of said shafts adjacent said main driving member and adapted to be moved into and out of driving engagement therewith, one of said members being fixedly secured to its shaft and one being loosely mounted thereon, differential driving mechanisms connecting said fixed and loose driving members and adapted to turn therewith, means for locking said differential mechanisms against bodily rotation, whereby said connnected members are driven in different directions, and means for moving and holding either said fixed or loose driving members in driving engagement with said main driving member, substantially as described.

7. In a power transmission mechanism, in combination, a main driving member adapted to be power driven, a main driving shaft rotatably mounted adjacent thereto and movable longitudinally, two driving members mounted on said shaft, one in fixed and one in loose relationship therewith, and adapted to be moved alternately into and out of driving engagement with said main driving member by the movement in opposite directions of said shaft longitudinally, a differential driving mechanism between said fixed and loose driving members and adapted to turn bodily therewith, means for moving said shaft longitudinally in opposite directions and for holding it in adjusted positions, and means for locking said differential mechanism against turning with said driving members whereby said driving members are driven in opposite directions, substantially as described.

8. A power transmission mechanism of the character referred to, comprising in combination, a main driving member adapted to be power driven, two main driving shafts mounted at opposite sides thereof and adapted to be moved longitudinally in both directions, a driving member fixedly secured to each shaft adjacent said main driving member, a driving member loosely mounted on each shaft, a differential driving mechanism connecting each loose driving member with the fixed driving member on the same shaft, means for holding said differential driving mechanism for the purpose indicated, and a power device for moving and holding each main driving shaft in different positions longitudinally, whereby to move either said fixed or loose driving member thereon in driving engagement with said main driving member, substantially as described.

9. A power transmission mechanism of the character referred to, comprising in combination a main casing, a main driving member mounted therein and adapted to be power driven, two driving shafts rotatably mounted therein at opposite sides of said main driving member and adjustable longitudinally, a driving member fixedly secured to each shaft adjacent said main driving member, a driving member loosely mounted upon each shaft, a differential mechanism connecting said fixed and loose members on each shaft, a brake mechanism for locking said differential mechanism against turning with said fixed and loose members, whereby to cause said members to be driven in opposite directions, and a power screw with operating connections, for moving and holding each main shaft in different positions longitudinally, whereby to put said different driving members on said shaft in driving engagement with said main driving member, substantially as described.

In testimony that I claim the foregoing as my own, I hereunto affix my signature in the presence of two subscribing witnesses.

ANDREW ANDERSON.

Witnesses:
PETER HOBERLIN,
J. O. HALL.